(12) United States Patent
Hiniker

(10) Patent No.: US 8,799,878 B2
(45) Date of Patent: *Aug. 5, 2014

(54) MULTI LEVEL VIRTUAL FUNCTION TABLES

(75) Inventor: David J. Hiniker, Seattle, WA (US)

(73) Assignee: Microsoft Corporation, Redmond, WA (US)

(\*) Notice: Subject to any disclaimer, the term of this patent is extended or adjusted under 35 U.S.C. 154(b) by 126 days.

This patent is subject to a terminal disclaimer.

(21) Appl. No.: 13/615,662

(22) Filed: Sep. 14, 2012

(65) Prior Publication Data

US 2013/0014092 A1   Jan. 10, 2013

Related U.S. Application Data

(63) Continuation of application No. 12/353,892, filed on Jan. 14, 2009, now Pat. No. 8,307,350.

(51) Int. Cl.
```
G06F 9/45      (2006.01)
G06F 9/44      (2006.01)
G06F 9/455     (2006.01)
```
(52) U.S. Cl.
CPC ...... *G06F 8/41* (2013.01); *G06F 8/433* (2013.01); *G06F 9/45516* (2013.01); *G06F 8/71* (2013.01)
USPC ............ 717/140; 717/148; 717/165; 717/166

(58) Field of Classification Search
CPC ............. G06F 8/41; G06F 8/71; G06F 8/443; G06F 9/45516
See application file for complete search history.

(56) References Cited

U.S. PATENT DOCUMENTS

| | | | |
|---|---|---|---|
| 5,093,914 A | 3/1992 | Coplien et al. | |
| 5,327,562 A | 7/1994 | Adcock | |
| 5,361,351 A | 11/1994 | Lenkov et al. | |
| 5,754,862 A | 5/1998 | Jones et al. | |
| 6,182,283 B1 | 1/2001 | Thomson | |
| 6,446,259 B2 * | 9/2002 | Brett | 717/165 |
| 6,631,513 B1 | 10/2003 | Gil et al. | |
| 6,751,793 B1 | 6/2004 | Lung et al. | |
| 6,754,887 B1 | 6/2004 | Gil et al. | |
| 6,836,879 B1 | 12/2004 | Myers | |
| 6,836,884 B1 * | 12/2004 | Evans et al. | 717/140 |
| 6,862,728 B2 | 3/2005 | Darnell et al. | |
| 6,895,581 B1 | 5/2005 | Chkodrov et al. | |

(Continued)

OTHER PUBLICATIONS

Michael James Van Emmerik, Static Single Assignment for Decompilation, 2007, pp. 208-221.*

(Continued)

*Primary Examiner* — Thuy Dao
*Assistant Examiner* — Mongbao Nguyen
(74) *Attorney, Agent, or Firm* — Tony Azure; Andrew Sanders; Micky Minhas

(57) ABSTRACT

A multi level virtual function table uses a hierarchy of chunks or segments of virtual function tables to identify methods for a particular class. At least one level of indirection pointers may point to individual virtual function table chunks, which may be shared by multiple classes. In some embodiments, fixed size chunks of virtual function tables may be used, other embodiments may use variable sized chunks of virtual function tables. In just in time compiled code, virtual function tables may be limited to sharing across parent and child classes, while in pre-compiled code, more complex sharing may be used.

20 Claims, 3 Drawing Sheets

(56) References Cited

U.S. PATENT DOCUMENTS

| | | |
|---|---|---|
| 6,944,637 B2 | 9/2005 | Darnell |
| 7,032,230 B2 | 4/2006 | Gray-Donald et al. |
| 7,100,153 B1 | 8/2006 | Ringseth et al. |
| 7,430,734 B2 | 9/2008 | Sollich |
| 7,516,449 B2 | 4/2009 | Agrawal |
| 7,644,402 B1* | 1/2010 | Daynes et al. ............ 717/166 |
| 7,676,801 B1* | 3/2010 | Garthwaite ............... 717/165 |
| 7,913,236 B2* | 3/2011 | Adl-tabatabai et al. ...... 717/140 |
| 8,079,023 B2 | 12/2011 | Chen |
| 8,127,284 B2* | 2/2012 | Meijer et al. ............. 717/166 |
| 2003/0046449 A1 | 3/2003 | Gray-Donald et al. |
| 2003/0131347 A1* | 7/2003 | Allison ................... 717/165 |
| 2005/0050528 A1 | 3/2005 | Wang |
| 2005/0223370 A1 | 10/2005 | Wu et al. |
| 2005/0289527 A1* | 12/2005 | Illowsky et al. ............ 717/148 |
| 2006/0130021 A1* | 6/2006 | Plum et al. ................ 717/140 |
| 2006/0253844 A1* | 11/2006 | Holt ........................ 717/148 |
| 2007/0038837 A1 | 2/2007 | Ben-Zvi |
| 2007/0245331 A1* | 10/2007 | Daynes et al. ............. 717/166 |
| 2007/0294505 A1 | 12/2007 | Traut et al. |
| 2008/0134158 A1 | 6/2008 | Salz et al. |
| 2008/0168433 A1 | 7/2008 | Arnold et al. |
| 2008/0184211 A1* | 7/2008 | Nickolls et al. ............ 717/140 |
| 2008/0282260 A1 | 11/2008 | Bozza et al. |
| 2009/0089767 A1* | 4/2009 | Daynes et al. ............. 717/148 |

OTHER PUBLICATIONS

Karel Driesen, The Direct Cost of Virtual Function Calls in C++, 1995, pp. 1-8.*

Anders Nilsson, Tailoring native compilation of Java for real-time systems, 2006, pp. 25-52.*

Sara Porat, Compiler Optimization of C++ Virtual Function Calls, Conference on Object-Oriented Technologies, 1996, pp. 4-8.

Karel Driesen, The Direct Cost of Virtual Function Calls in C++, Depertent of Computer Science University of California, 1995, pp. 2-6.

Alex, The virtual table, The Power of Code, Full Sail University, 2008, pp. 1-5.

* cited by examiner

MULTI LEVEL VIRTUAL FUNCTION TABLES

RELATED APPLICATIONS

This application is a continuation of, and claims priority to, U.S. patent application Ser. No. 12/353,892, filed Jan. 14, 2009, and entitled "MULTI LEVEL VIRTUAL FUNCTION TABLES." The disclosure of the above-identified application is hereby incorporated by reference in its entirety as if set forth herein in full.

BACKGROUND

Virtual function tables are used in many computer languages, including C++, C#, Java, and others to enable dynamic dispatch, runtime method binding, and other features. An entry in a virtual function table may contain a reference to a method. When a class is derived from another class, the derived class inherits the contents of a virtual function table and may replace one or more of the references in the derived class's virtual function table with references to new functions. This mechanism enables a child class to receive the methods of the parent, but may replace one or more of those methods with new methods, in addition to adding more methods.

The inheritance capabilities of classes within these computer languages are typically implemented by creating a new virtual function table for each class. In cases where many such classes are used, the virtual function tables may consume large amounts of memory, leading to slow startup time and large resource usage.

SUMMARY

A multi level virtual function table uses a hierarchy of chunks or segments of virtual function tables to identify methods for a particular class. At least one level of indirection pointers may point to individual virtual function table chunks, which may be shared by multiple classes. In some embodiments, fixed size chunks of virtual function tables may be used, other embodiments may use variable sized chunks of virtual function tables. In just in time compiled code, virtual function tables may be limited to sharing across parent and child classes, while in pre-compiled code, more complex sharing may be used.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
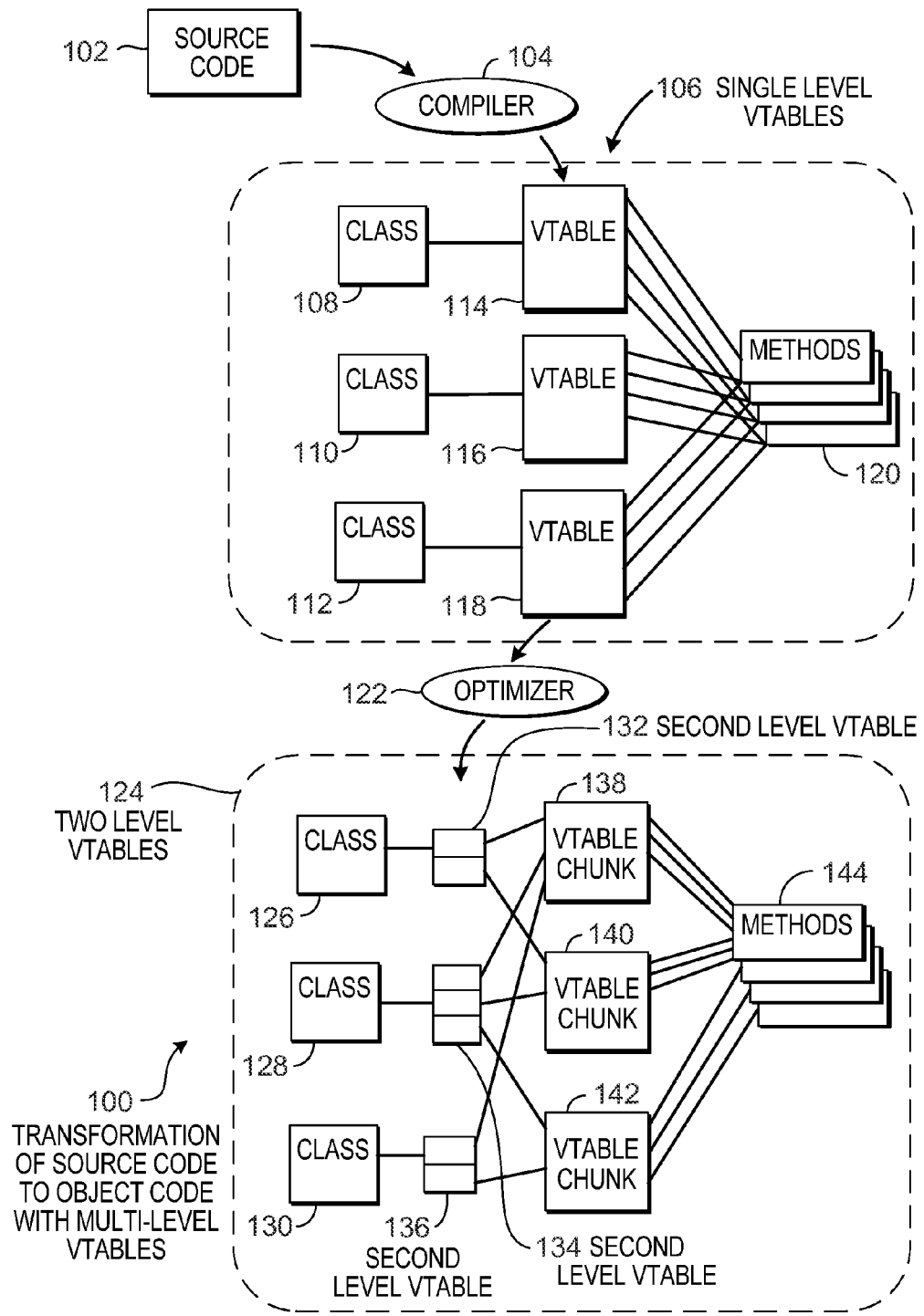
FIG. 1 is a diagram illustration of an embodiment showing the creation of multi-level virtual function tables given source code as input.

Compiled code may use a multi level virtual function table to call methods within classes. The multi level virtual function table may result in a compact and efficient use of memory in complex complied code, especially when classes share inherited methods.

A compiler may create code using multi level virtual function tables by creating chunks of virtual function tables, where one or more chunks may comprise a complete virtual function table for a particular class. A second level virtual function table may be used to contain indirection pointers that point to specific chunks of virtual function tables.

The virtual function table chunks may be defined using several different mechanisms. In a simple embodiment, virtual function table chunks may be defined using a predefined number of pointers, or a predefined series of numbers of pointers. In a more complex embodiment, the size of a virtual function table chunk may be defined by analyzing a set of first level virtual function tables for multiple classes and determining optimized chunk sizes.

In embodiments where compilation may be performed prior to runtime, a large amount of analysis and optimization may be performed. In just in time compilers, where the compilation is performed at runtime, a more limited amount of analysis may be performed. In some just in time compiler embodiments, analysis may be limited to those classes that share inherited methods, such as those classes having a parent/child relationship.

Within this specification, the term virtual function table may be represented by the shorthand "vtable". The term is used throughout the figures.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system that may create multi level virtual function tables. Embodiment 100 is a simplified example of the concept of creating multi level virtual function tables that may share chunks of virtual function tables.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 100 illustrates a source code 102 that is compiled by a compiler 104, then further optimized using an optimizer 122. In many embodiments, the functional components illustrated in embodiment 100 may be implemented in compiler software that is operable on a general purpose computer. A general purpose computer may have a processor that executes instructions to perform the functions of a compiler 104 and optimizer 122. In other embodiments, some or all of the functionality of the compiler 104 and optimizer 122 may be implemented in hardware, such as in an application specific integrated circuit (ASIC), field programmable gate array (FPGA), or other hardware device.

The compiler 104 may receive source code 102 and create single level virtual function tables 106. Virtual function tables are a mechanism by which dynamic dispatch or runtime method binding may be implemented. Virtual function tables enable inheriting classes to substitute its methods for methods of a parent class. In many cases, a child class may inherit many methods of a parent, and may add other methods.

The single level virtual function tables 106 may have several classes 108, 110, and 112, each of which may have a separate virtual function table 114, 116, and 118, respectively. Each of the virtual function tables 114, 116, and 118 may contain references to the various methods 120.

In many cases, different classes may refer to the same methods, especially in cases where one class is a child of a parent class and inherits many of the methods. In such cases, the virtual function tables 114, 116, and 118 may have multiple function references that are common between two or more of the classes 108, 110, and 112.

The optimizer 122 may create two level virtual function tables 124 to represent the virtual function tables 114, 116, and 118. The optimizer 122 may create virtual table chunks 138, 140, and 142 that represent either commonly shared portions of a virtual function table or a portion of a virtual function table that is specific for a particular class. A second level virtual function table 132, 134, and 136 may be used to point to a particular virtual function table chunk, and an entry in the virtual function table chunk may then contain a reference to a particular method 144.

The second level virtual function tables 132, 134, and 136 may contain a set of pointers that each point to one of the virtual function table chunks 138, 140, and 142. In cases where a virtual function table chunk is identical for two or more classes, the respective second level virtual function table may all point to that single virtual function table chunk.

In the example of diagram of embodiment 100, the second level virtual function tables 132, 134, and 136 all point to the virtual function table chunk 138. The virtual function table chunk 138 is thus used three times, while in the single level virtual function tables 106, the method references within the virtual function table chunk 138 would be included in each of the virtual function tables 114, 116, and 118.

The change between the single level virtual function tables 106 and the two level virtual function tables 124 is that the duplicated portions of the single level virtual function tables 114, 116, and 118 may be consolidated into one or more virtual function table chunks. In some testing of such a system, a memory reduction of 50% or more has been achieved for some commercial software applications due to the virtual function table consolidation.

In many embodiments, the compiler 104 and optimizer 122 may be combined into a single entity. In some embodiments, the optimizer 122 may be one of many optimization passes that are made on compiled code to generate highly optimized object code. In other embodiments, the functions of the optimizer 122 may be performed after compilation in a standalone process.

Precompiled code, for the purposes of this specification and claims, may be code that is compiled and stored prior to execution. In many cases, precompiled code may be packaged and distributed as an executable code that may be executed on a processor. Precompiled code may be highly optimized, which may consume large amounts of processing power during compiling and optimization.

Just in time compilers may perform compilation at runtime. In many cases, the source code used by a just in time compiler may have been pre-compiled or partially compiled from an original source code into intermediate code. Just in time compilers are used in some systems for creating an executable directly at runtime, which may allow binding of certain objects at runtime that may not be possible in precompiled code. Because just in time compilers perform compilation at runtime, optimization of the compiled code is often less extensive than precompiled code. In general, extra time spent during just in time compiling can delay a software program execution, resulting in a poor user experience.

Various methods may be used to select the size and contents of the virtual function table chunks 138, 140, and 142. In some cases, an analysis routine may evaluate several classes to determine what portions of the single level virtual function tables are common to two or more classes and create virtual function table chunks according to the common portions. Such an optimization may select the virtual function table chunk size after analyzing two or more classes.

Some embodiments may select varying sizes of virtual function table chunks, based on the portions of single level virtual function tables that are common to classes. Such analyses may span many different classes, including classes within a source code module, as well as classes in different source code modules.

In other embodiments, virtual function table chunks may be assigned to a class based on previously created virtual function table chunks. In such an embodiment, a class with a single level virtual function table may be analyzed to determine if one or more existing virtual function table chunks map to a portion of the current class's single level virtual function table. If so, a second level virtual function table may be created pointing to an existing virtual function table chunk, and one or more new virtual function table chunks may be created to reference those methods that are not referenced by any other virtual function table chunk.

In some embodiments, a virtual function table chuck that is referenced by a second level virtual function table may contain references to more methods than may be called by a class. Other embodiments may not permit unreferenced methods to be included in a multi level virtual function table for a specific class.

Some embodiments may use a fixed size for a virtual function table chunk. For example, some embodiments may use a predefined size for each virtual function table chunk of eight method references. Other embodiments may use 4, 5, 6, or some other number of references. In some cases, a sequence of numbers may be established.

An example of such a sequence may be to have the first virtual function table chunk contain four method references, then any subsequent virtual function table chunks contain eight method references. Such a sequence may be useful when the top class in the inheritance hierarchy has a virtual function table that contains four method references.

Fixed size virtual function table chunks may be used in embodiments where it is difficult or costly to analyze multiple classes to determine an optimized size of a virtual function table chunk. Such embodiments may include cases where some portions of source code are compiled after other portions, such as when a compiler compiles a small section of source code and links the newly compiled code with libraries of precompiled code. Another embodiment may be just in time compilers where simple algorithms may be used to minimize compilation time.

In some embodiments, newly complied code may be compared to available virtual function table chunks to determine if an existing virtual function table chunk may be referenced by the newly compiled code. In some such embodiments, a search may be made over all compiled code within an application package, such as any libraries or other previously compiled code. Such searches may involve identifying a proposed virtual function table chunk, creating a hash of the virtual function table chunk, and comparing the hash to a hash table of existing virtual function table chunks. If a match exists, the existing virtual function table chunk may be referenced, otherwise a new virtual function table chunk may be created and referenced.

In some such embodiments a search may be made across all available virtual function table chunks, or the search may be limited using some heuristic or algorithm. In some cases, the search may be limited to virtual function table chunks in a current source code module, while in other cases, a search may cross source code modules.

A search may be limited to those classes sharing a parent/child relationship. Because virtual function tables are largely duplicated by inheritance, a search limited to parent/child relationships may yield a large number of duplicate virtual function table chunks while limiting the scope of the search.

When a highly optimized object code is desired, such as when using precompiled code, variable sized virtual function table chunks may be determined after analyzing many different classes to find virtual function table chunks that minimize the overall memory usage. Some highly optimized object code may also analyze virtual function tables from many different classes, including analyzing across module boundaries.

When a faster compile time is desired, such as when using a just in time compiler, a fixed size virtual function table chunk may be used. Another method for limiting compile time may be to limit the search for reusable virtual function table chunks to analyzing classes that share a parent/child relationship.

Some embodiments may have different levels of optimization. For example, an optimizer for precompiled code or a just in time compiler may create fixed sized virtual function table chunks and may reuse those chunks for classes having a parent/child relationship. The same compiler may have an option that may enable more extensive optimization, including using variable sized virtual function table chunks.

Embodiment 100 is illustrated as a separate compiler 104 and optimizer 122, where an intermediate step in the overall process is to create single level virtual function tables 106. Some embodiments may not create the single level virtual function tables 106 and may be configured to create two level virtual function tables 124 without an intermediate step.

In some embodiments, several portions of source code 102 may be separately compiled to create single level virtual function tables 106. In such an embodiment, some portions of source code may be partially compiled into intermediate code. Some such embodiments may compile code into libraries or other modules that may be later combined using a linker. In such embodiments, the function of the optimizer 122 may be performed at linking or at some other time.

Embodiment 100 illustrates an embodiment showing two level virtual function tables. The two level virtual function table example in embodiment 100 is a simple example of a hierarchical virtual function table. Other embodiments may have three, four, or more levels of virtual function tables.

Figure 2:
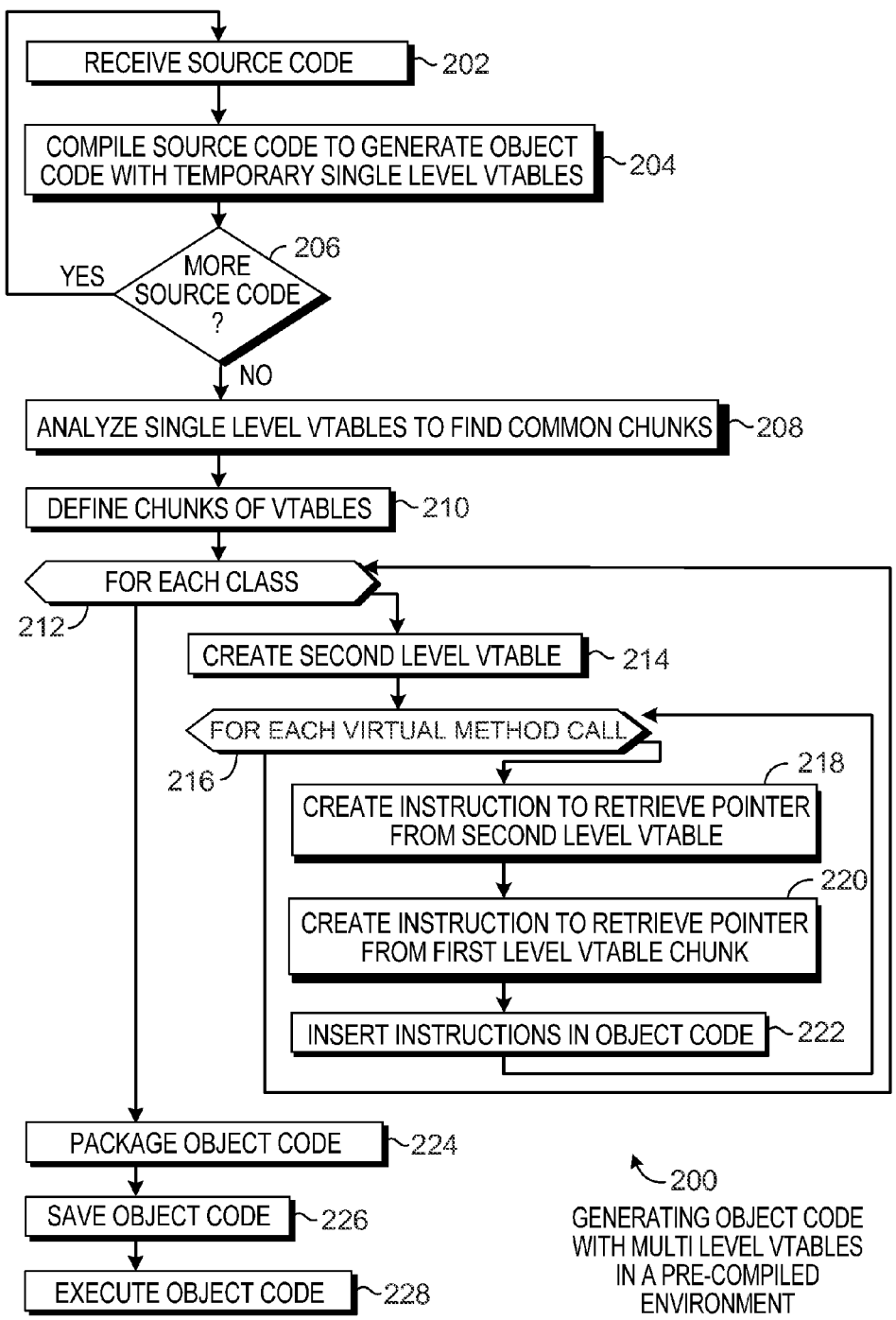
FIG. 2 is a flowchart illustration of an embodiment showing a method for generating object code with multi-level virtual function tables in a precompiled environment.

FIG. 2 is a flowchart illustration of an embodiment 200 showing a method for generating object code with multi level virtual function tables in a precompiled environment. Embodiment 200 is a simplified example of merely one method for using one form of optimization for tailoring virtual function table chunks to optimize memory usage.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 illustrates one method by which an optimized configuration of virtual function table chunks may be determined. In an optimized configuration, the virtual function table chunks may be selected to maximize the number of classes that may share a virtual function table chunk. In general, as more and more classes can share a virtual function table chunk, less memory is consumed with virtual function tables.

In many embodiments, a set of heuristics, formulas, or algorithms may be used to break a set of single level virtual function tables into chunks that may be reused by multiple classes. Embodiments 200 and 300, which is presented later in this specification, may present examples of such optimization mechanisms. The optimization mechanisms presented herein are merely examples of different types of optimization and are not meant to be limiting.

Source code may be received in block 202 and compiled in block 204 to create object code with temporary single level virtual function tables. In some embodiments, the compilation in block 204 may result in intermediate code that is further compiled, or in object code that is executable or close to executable.

If more source code is available in block 206, the process may return to block 202 to process additional source code. In some embodiments, especially precompiled embodiments, source code may be compiled into libraries or other modules and may be later linked together. In some cases, one portion of the source code may be compiled many days or even years prior to other portions of the source code.

In block 208, the single level virtual function tables may be analyzed to find common chunks. The common chunks may be portions of virtual function tables that may contain entries of method references. In block 210, the chunks of virtual function tables may be defined.

Blocks 208 and 210 may perform an optimization to determine the smallest overall size of virtual function tables across multiple classes. In some embodiments, an optimization routine may consider the single level virtual function tables from all available classes and select an optimized set of virtual function table chunks. Such an optimization routine may use any technique for finding an optimized set of virtual function table chunks.

An optimization routine may perform an optimization in multiple passes. In one example of such an optimization routine, single level virtual function tables may be analyzed to identify the most common pattern or common group of method references. A virtual function table chunk may be identified for the common group. The optimization routine may analyze the remaining portions of single level virtual function tables to identify the next most common pattern, which may become another virtual function table chunk. The optimization routine may repeat the analysis until no further common blocks may be determined.

Such a multi-pass optimization routine may perform under certain parameters or limitations. For example, the virtual function table chunks may be a fixed size, such as four, eight, sixteen, or some other number of pointers. One example of an optimization routine defines a group of method references as a chunk when that group is found in three classes for example, and the optimization routine does not analyze any remaining classes for that pattern. The parameters discussed here are merely examples of possible values of such parameters.

Many factors may affect the optimization routines. For example, certain computer languages may have different parameters that result in better optimization. In some cases, the programming style of different developers may affect optimization, and each type of program or application may optimize differently.

After the chunks are defined in block 210, each class may be analyzed in block 212.

For each class in block 212, a second level virtual function table may be created in block 214. For each virtual method call within the class in block 216, a first instruction may be created in block 218 to retrieve a pointer from the second level virtual function table. A second instruction may be created in block 220 to retrieve a pointer from the first level virtual function table chunk. The instructions may be inserted into the object code in block 222.

In many embodiments, the object code may be written in Assembly language. In a single level virtual function call, an example may be:

```
mov eax, [ecx]
call [eax + 0x38]
``` where ecx is a pointer to the first level virtual function table, and 0x38 is an offset within the first level virtual function table for the method entry.

In a two level virtual function call, an example object code may be:

```
mov eax, [ecx]
mov eax, [eax + 0x2c]
call [eax + 0x4]
``` where ecx is a pointer to the second level virtual function table, 0x2c is an offset to a pointer to the first level virtual function table chunk, and 0x4 is the offset within the first level virtual function table for the method entry.

In the code example above, a two level virtual function table embodiment may use three commands to perform the same operation as two commands that would be used in a single level virtual function table embodiment.

After the object code is modified in block 222, the process may return to block 216 to process another virtual method call. After all of the virtual method calls are processed in block 216, the process may return to block 212 to process another class.

After all the classes are processed in block 212, the object code may be packaged in block 224 and saved in block 226. The object code may be executed in block 228 at some later time.

In block 224, the object code may be packaged for execution. In some cases, the object code may be packaged as an executable program, dynamic linked library, or some other form. In some cases, the object code may be executed with other executable code, while in other cases, the object code may be executed on its own without other executable or non executable code.

Figure 3:
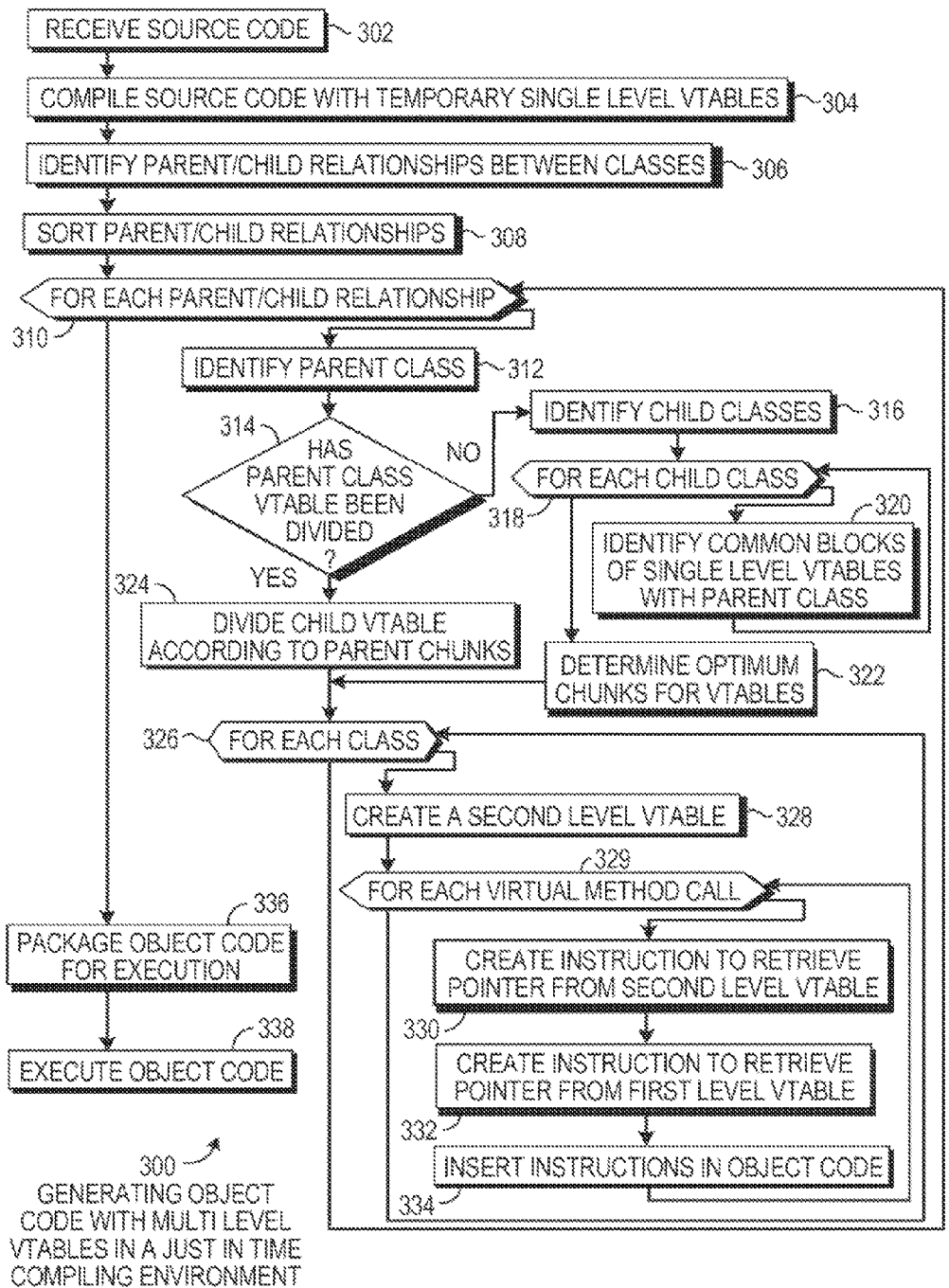
FIG. 3 is a flowchart illustration of an embodiment showing a method for generating object code with multi-level virtual function tables in a just in time compiling environment.

FIG. 3 is a flowchart illustration of an embodiment 300 showing a method for generating object code with multi level virtual function tables in a just in time compiled environment. Embodiment 300 is a simplified example of merely one method for using one form of optimization for tailoring virtual function table chunks to optimize memory usage while minimizing compilation time.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 performs a similar result as embodiment 200, but uses different logic or sequencing. In embodiment 200, more complex optimization techniques may be used to identify chunks of virtual function tables, then create and insert the instructions for calling a method using a two level virtual function table into the object code. In embodiment 300, a potentially faster method is shown that will implement a two level virtual function table.

Embodiment 300 may use parent/child relationships to identify those classes that have a high probability of containing duplicate portions of a single level virtual function table. By restricting the analysis to parent/child relationships, embodiment 300 may perform a more limited optimization than embodiment 200, but may achieve reasonable optimization results.

Embodiment 300 is selected as a possible optimization routine that may be used for just in time compilers. A just in time compiler may perform some compilation and linking activity when a computer application is started. As such, a user's may be made to wait for the compilation to be performed prior to using the computer application. By minimizing the complexity of the compilation and optimization, a shorter compilation may enhance the user experience.

Source code may be received in block 302 and may be compiled with temporary single level virtual function tables in block 304. In some just in time compilers, the source code of block 302 may be intermediate code that is partially compiled into an intermediate language.

After the source code is compiled in block 304, parent/child relationships may be identified between classes in block 306.

The parent/child relationships may be sorted in block 308 and each parent/child relationship may be analyzed individually in block 310. In some embodiments, the parent/child relationships may be sorted from the highest level parent to the lowest child, while in other embodiments, the parent/child relationships may be sorted from the lowest child to the highest parent.

For each of the parent/child relationships in block 310, the parent class may be identified in block 312. If the parent class has not had the single level virtual function table divided into chunks in block 314, the child classes may be identified in block 316 and analyzed in block 318.

If the parent virtual function table has not been divided into chunks, the chunks may be defined by identifying the common blocks within the child classes. In some embodiments, a single child class may be identified in block 316. In other embodiments, all child classes may be identified in block 316 and analyzed in block 318. Some embodiments may place some limitations on the child classes, such as limiting the analysis to those classes with a first level parent/child relationship or by analyzing a limited number of child classes.

For each child class in block 318, the common blocks of single level virtual function tables may be identified, where the blocks are in common with the parent class. After finding the common blocks in block 320 for each of the child classes in block 318, the optimum chunks of virtual function tables may be determined in block 322.

If the parent class had its virtual function table divided into chunks in block 314, the child virtual function table may be divided using common chunks with the parent in block 324.

In a similar manner as blocks 212 through 222 of embodiment 200, the object code may be modified in blocks 326 through 334.

For each class in block 326, a second level virtual function table may be created in block 328. For each virtual method call within the class in block 329, a first instruction may be created in block 330 to retrieve a pointer from the second level virtual function table. A second instruction may be created in block 332 to retrieve a pointer from the first level virtual function table chunk. The instructions may be inserted into the object code in block 334.

After each parent/child relationship has been analyzed in block 310, the object code may be packaged for execution in block 336 and may be executed in block 338.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A computer storage memory storing computer-executable instructions that when executed perform actions comprising:
   compiling source code to create object code, the source code comprising a plurality of classes, each of the classes having references to at least one method;
   for each of the classes, creating a temporary virtual function table, the temporary virtual function table including pointers to methods called within the classes;
   analyzing the temporary virtual function tables to identify portions of virtual function tables that may be shared by two or more of the classes;
   creating chunks of virtual function tables, each of the chunks of virtual function tables including a plurality of pointers, each of the pointers being a pointer to one of the methods;
   for each of the classes, creating a second level virtual function table having indirection pointers, each of the indirection pointers being a pointer to one of the chunks of virtual function tables; and
   for each method call within the object code, creating a first instruction to retrieve a chunk from the second level virtual function table, and creating a second instruction to retrieve a pointer to one of the methods from the chunk.

2. The computer storage memory of claim 1, said compiling being performed at runtime.

3. The computer storage memory of claim 2, said chunks being created by analyzing a parent/child relationship between two of said classes to identify a size of at least one of said chunks.

4. The computer storage memory of claim 1, said compiling being performed prior to runtime.

5. The computer storage memory of claim 1, said chunks of virtual function tables having a predefined number of pointers.

6. The computer storage memory of claim 5, said predefined number of pointers comprising a predefined sequence of numbers.

7. The computer storage memory of claim 1, said chunks of virtual function tables having variable number of pointers.

8. The computer storage memory of claim 7, said variable number of pointers being determined during compilation.

9. The computer storage memory of claim 1, at least one of said chunks being referenced in said second level virtual function table by two different classes.

10. The computer storage memory of claim 9, said two different classes having a parent/child relationship.

11. The computer storage memory of claim 9, said two different classes being within a single executable code module.

12. The computer storage memory of claim 9, said two different classes being in separate executable code modules.

13. The computer storage memory of claim 9, said two different classes being in separate source code modules.

14. A system comprising:
a processor configured to:
compile source code to create object code, the source code comprising a plurality of classes, each of the classes having references to at least one method;
for each of the classes, create a temporary virtual function table, the temporary virtual function table including pointers to methods called within the classes;
analyze the temporary virtual function tables to identify portions of virtual function tables that may be shared by two or more of the classes;
create chunks of virtual function tables, each of the chunks of virtual function tables including a plurality of pointers, each of the pointers being a pointer to one of the methods;
for each of the classes, create a second level virtual function table having indirection pointers, each of the indirection pointers being a pointer to one of the chunks of virtual function tables; and
for each method call within the object code, create a first instruction to retrieve a chunk from the second level virtual function table, and
create a second instruction to retrieve a pointer to one of the methods from the chunk.

15. The system of claim 14, the processor being further configured to analyze the temporary virtual function tables at least partly by evaluating parent/child relationships between said classes.

16. The system of claim 15, the processor being further configured to compile the source code prior to runtime.

17. A system comprising:
a processor configured to provide a compiler, the compiler comprising:
a code generator configured to receive source code and create a first object code; and
a code optimizer configured to optimize said first object code and create optimized object code, said code optimizer configured to perform a method comprising:
for each class defined in said source code, creating a temporary virtual function table, said temporary virtual function table comprising pointers to methods called within said class;
analyzing said temporary virtual function tables to identify chunks of virtual function tables that may be shared by two or more of said classes;
creating chunks of virtual function tables, each of said chunks of virtual function tables comprising a plurality of said pointers;
for each of said classes, creating a second level virtual function table having indirection pointers, each of said indirection pointers being a pointer to one of said chunks of virtual function tables; and
creating said optimized object code by a method comprising:
for each method call within said first object code, creating a first instruction to retrieve a chunk from said second level virtual function table, and creating a second instruction to retrieve a pointer to one of said methods from said chunk.

18. The system of claim 17, said compiler being a just in time compiler.

19. The system of claim 18, said analyzing comprising identifying at least two of said classes related by a parent/child relationship.

20. The system of claim 17, said second level virtual function tables comprising a predefined number of said pointers.

* * * * *